United States Patent [19]

Idogawa et al.

[11] Patent Number: 5,437,715
[45] Date of Patent: Aug. 1, 1995

[54] RECORDING MATERIAL CONTAINING CARBONACEOUS POWDER WHOSE SURFACE IS MODIFIED WITH FLUORINE GAS

[75] Inventors: Hiroyuki Idogawa, Kyoto; Atsushi Wakata, Fujioka; Nobuatsu Watanabe, Nagaokakyo; Yong-Bo Chong, Kyoto, all of Japan

[73] Assignee: Mitsubishi Pencil Kabushiki Kaisha, Tokyo, Japan

[21] Appl. No.: 101,177

[22] Filed: Aug. 3, 1993

[30] Foreign Application Priority Data

Aug. 31, 1992 [JP] Japan .................................. 4-253449

[51] Int. Cl.$^6$ .............................................. C09D 11/16
[52] U.S. Cl. ................................. 106/20 R; 106/19 D
[58] Field of Search .................. 106/19 A, 19 D, 20 R

[56] References Cited

U.S. PATENT DOCUMENTS

| 4,036,786 | 7/1977 | Tiedmann | 252/511 |
| 4,545,818 | 10/1985 | Inoue et al. | 106/20 R |
| 4,612,052 | 9/1986 | Schwartz | 106/20 R |
| 4,704,163 | 11/1987 | Baratto et al. | 106/20 R |
| 4,960,464 | 10/1990 | Chen | 106/19 D |
| 5,175,048 | 12/1992 | Inaba et al. | 428/213 |

FOREIGN PATENT DOCUMENTS 60-191011  9/1985  Japan .
5-78110  3/1993  Japan .

OTHER PUBLICATIONS 5-78110, *Patent Abstract* (Mar. 1993).
60-191011, *Patent Abstract* (Sep. 1985).

*Primary Examiner*—Helene Klemanski
*Attorney, Agent, or Firm*—Darby & Darby

[57] ABSTRACT

The present invention provides a recording material containing a carbonaceous powder whose surfaces are modified with a fluorine gas. Even when the recording material of the present invention is stored for a long period of time, a carbonaceous powder such as a graphite powder or carbon black neither coheres nor precipitates. For example, even if the recording material of the present invention is used in a felt pen or a ball-point pen, the carbonaceous powder does not cohere in the container or the pen point, and therefore any clogging does not occur in the pen point and good writing is possible.

2 Claims, No Drawings

RECORDING MATERIAL CONTAINING CARBONACEOUS POWDER WHOSE SURFACE IS MODIFIED WITH FLUORINE GAS

BACKGROUND OF THE INVENTION (i) Field of the Invention

The present invention relates to a recording material containing a carbonaceous powder whose surface is modified with a fluorine gas.

More specifically, it relates to an ink for a writing instrument such as a ball-point pen or a felt pen.

(ii) Description of the Related Art

As an ink for use in a writing instrument such as a ball-point pen or a felt pen, there has heretofore been known an aqueous ink which can be prepared by dissolving or dispersing a dye or a pigment as a colorant in an aqueous medium comprising water singly or a mixture of water and a water-soluble organic solvent.

However, the conventional aqueous ink containing the dye is poor in fastness properties such as light resistance and water resistance. On the other hand, in the conventional aqueous ink containing the dispersed pigment, the problem of the fastness properties can be solved to some extent, but the long-term dispersing stability of the pigment is poor, so that the writing instrument tends to clog with time. Alternatively, the viscosity of the ink increases, so that any lines cannot be written by the writing instrument any more irrespective of a line writing speed, and in other words, writing is inconveniently impossible.

SUMMARY OF THE INVENTION

An object of the present invention is to provide a recording material suitable for a writing instrument such as a ball-point pen or a felt pen, and this recording material has preferable characteristics which permit stably dispersing a carbonaceous powder pigment such as a graphite powder or carbon black in an aqueous solvent for a long period of time and also permit giving lines excellent in light resistance and water resistance.

The present inventors have intensively conducted researches, and as a result, they have found that the above-mentioned object can be achieved by using, as a recording material such as an ink, a carbon powder pigment such as carbon black whose surfaces are treated with a fluorine gas. In consequence, the present invention has been completed. That is, a recording material of the present invention is characterized by containing a carbonaceous powder whose surfaces are treated with a fluorine gas.

DETAILED DESCRIPTION OF PREFERRED EMBODIMENTS

A carbonaceous powder which can be used in the present invention is a powder of graphite, pitch coke, carbon black or the like, and the particle diameter of the carbonaceous powder is suitably selected in accordance with an application but it is preferably 5 $\mu$m or less.

As conditions desirable to obtain the carbonaceous powder whose surfaces modified with a fluorine gas which can be used in the recording material of the present invention, a treatment temperature is preferably from $-80°$ to $150°$ C. If the treatment temperature is too high, covalent C—F bonds are formed on the surfaces of the carbonaceous powder, and the affinity of the carbonaceous powder for an aqueous medium noticeably deteriorates, which is contrary to the object of the present invention. The temperature at which the formation of the covalent C—F bonds are begun depends upon the kind of carbonaceous powder. For example, such a temperature is 200° C. or less in the cases of amorphous carbon, pitch coke and carbon black; it is about 300° C. in the case of artificial graphite; and it is about 380° C. in the case of natural graphite. The crystalline structure of the carbonaceous powder and the chemical structure of the surfaces have a large influence on the reaction with fluorine. Therefore, the treatment temperature is suitably selected in compliance with the kind of carbonaceous powder. For example, in the case of the natural graphite, the crystalline structure and the chemical structure of the surfaces are complete, and therefore the natural graphite is inert to the fluorine gas, and the treatment temperature may be as high as about 100° C., preferably in the vicinity of room temperature. In the case of the carbon black, the crystalline structure and the chemical structure of the surfaces is incomplete, and therefore the carbon black is active to the fluorine gas, and the treatment temperature is preferably as low as room temperature or less. When the treatment is made under such temperature conditions, ionic C—F bonds or fluorine-containing functional groups are formed on the surfaces of the carbonaceous powder, so that the affinity of the carbonaceous powder for the aqueous medium can be remarkably improved to achieve the object of the present invention.

By the way, the reaction of the carbonaceous powder with the fluorine gas is an exothermic reaction, and when the fluorine gas is abruptly introduced into a reaction vessel, the temperature of the carbon powder surfaces rises as much as several tens to 200° C. by reaction heat. In such a case, the covalent C—F bonds are unpreferably formed on the surfaces of the carbonaceous powder. Therefore, the fluorine gas is preferably introduced into the reaction vessel as slowly as possible, and it is preferable to increase the fluorine gas pressure in the reaction vessel at a rate of 0.5–100 mmHg (the partial pressure of fluorine) per minute.

No particular restriction is put on the pressure of the fluorine gas necessary to modify the surfaces of the carbonaceous powder with the fluorine gas, and this pressure may be increased or decreased (the partial pressure of fluorine). However, the pressure of the fluorine gas is preferably in the range of 1 mmHg to 760 mmHg (the partial pressure of fluorine) for the treatment. The only surfaces of the carbonaceous powder are modified with the fluorine gas, and therefore, even if the pressure of the fluorine gas is increased, a corresponding effect cannot be expected any more. Furthermore, after the fluorine gas pressure has reached a predetermined level, a time (a treatment time) for which this pressure is held is a time for which fluorine is uniformly fed to the surfaces of the carbonaceous powder, and the treatment time is usually in the range of 0.5 minute to 1 hour. If the treatment time is less than 0.5 minute, it is difficult to uniformly carry out the fluorine gas treatment. If it is more than 1 hour, a corresponding effect cannot be expected.

Moreover, the fluorine gas can be used singly or in the form of a mixture of the same and nitrogen, a rare gas such as helium or argon, or air.

The recording material of the present invention can be prepared by mixing the carbonaceous powder whose surfaces are modified with the fluorine gas, a solvent (a dispersant) and a binder. The carbonaceous powder having the surfaces modified with the fluorine gas which is used in the recording material of the present invention is excellent in the affinity for the dispersant or the binder, and thus it can be utilized for the preparation of carbonaceous molded articles having improved strength or as a carbonaceous dispersant having good dispersing stability in addition to the recording material.

No particular restriction is put on the content of the carbon powder whose surfaces are modified with the fluorine gas in the recording material of the present invention, so long as the content of the carbonaceous powder is such that the recording material permits writing sufficiently recognizable characters and lines in the case that the carbon powder is used as an ink for a writing instrument. In general, the content of the carbonaceous powder is preferably in the range of 3 to 30% by weight. Furthermore, if necessary, the carbonaceous powder of the present invention may contain a carbonaceous powder in a certain ratio which is not treated with the fluorine gas.

A solvent which can be used for the recording material of the present invention is water or a mixed solvent of water and a water-soluble organic solvent. Examples of the water-soluble organic solvent include polyvalent alcohols such as ethylene glycol, diethylene glycol and glycerin; glycol ethers such as ethylene glycol monomethyl ether and diethylene glycol monoethyl ether; and a glycol ether ester such as ethylene glycol monoethyl ether acetate. These water-soluble organic solvents may be used singly or in a combination of two or more thereof.

For example, in the case that the solvent is used together with an ink for a writing instrument, no particular restriction is put on the content of the solvent in the recording material, so long as the content of the solvent is such that the recording material permits writing sufficiently recognizable characters and lines. In general, the content of the solvent is preferably in the range of about 40 to about 80% by weight.

No particular restriction is put on the kind and the amount of binder which can be used in the recording material of the present invention, so long as the binder permits sufficiently binding the characters and lines of the recording material to a recording medium such as a paper. The kinds of usable binder are a water-soluble and a water-dispersible resin. Examples of the water-soluble resin include a water-soluble acrylic resin, a water-soluble styrene-acrylic resin and a water-soluble styrene-maleic acid resin. Examples of the water-dispersible resin include emulsions of a vinyl acetate copolymer and an acrylic acid copolymer. The amount of this resin to be mixed is preferably in the range of about 1 to about 20% by weight.

The recording material of the present invention can be prepared by mixing the carbonaceous powder having surfaces modified with the fluorine gas, the solvent and the resin, but if necessary, some additives may be mixed with the above-mentioned materials, so long as they do not impair the object of the present invention. Examples of such additives include lubricants such as potassium linoleate, sodium ricinoleate, potassium oleate and sodium oleate; antiseptic agents such as phenol and sodium benzoate; anti-corrosive agents such as benzotriazole, dicyclohexylammonium•nitrite and diisopropylammonium•nitrite; and pH modifiers such as triethanolamine, monoethanolamine, diethanolamine and ammonia.

In general, the carbonaceous powder is composed of 80% or more of carbon and the balance of oxygen, hydrogen, slight sulfur and mineral (ash), and the like. Most of the surfaces of the carbonaceous powder are mainly covered with basal planes of graphite crystals, and surface carbon atoms in particle boundaries of the surfaces or prism surfaces of lattice defects are bonded to oxygen, hydrogen and sulfur to form various surface functional groups. Known examples of the typical surface functional groups include a phenolic hydroxyl group, a carboxyl group, a carbonyl group, a lactone group and a quinone group.

When the surfaces of such a carbonaceous powder are modified with the fluorine gas in accordance with the above-mentioned procedure, it can be considered that charge-movable ionic C—F bonds are formed in the basal planes of the graphite crystals, and the surface functional groups change into other fluorine-containing functional groups (e.g., —CF=O, =C—OF, —OF and the like). As a result of the formation of the ionic C—F bond and the fluorine-containing functional groups, the surfaces of the carbonaceous powder have a large polarity, so that the affinity of the carbonaceous powder for water is remarkably improved and negative surface charges increase. Therefore, the carbonaceous powder having the surfaces modified with the fluorine gas which is concerned with the recording material of the present invention shows a excellent dispersion stability in an aqueous medium.

Incidentally, the recording material of the present invention can be utilized in many fields of a liquid developing toner, a printing ink, a coating material and the like in addition to the ink for a writing instrument.

The recording material of the present invention neither coheres nor precipitates, even when stored for a long period of time. For example, even in the case that the recording material is used in a felt pen or a ball-point pen, the carbonaceous powder does not cohere in its container or pen point. Therefore, any clog does not occur in the pen point, so that good writing is possible.

EXAMPLES

Now, the present invention will be described in more detail in reference to examples, but the scope of the present invention should not be limited to these examples, so long as they do not deviate from its gist. In the examples, the evaluation of characteristics was carried out by the following procedures.

Dispersibility: This was evaluated by measuring an average particle diameter of a carbonaceous powder contained in the recording material by a coal tar counter.

Writing performance: The container of an aqueous ball point-pen or a felt pen (a raw ink system; the thickness of its pen pint=about 3 mm) was filled with a recording material, and a line of 10 m was written. In this case, writing properties such as a writing performance and scratching were observed and judged by "good" or "poor". In this case, a writing paper A (unit weight=80 g/m$^2$ or more) was used as a paper.

Stability with time: A 200 ml glass bottle with a cap was filled with the recording material, and it was then allowed to stand at 50° C. for 1 month. Afterward, presence/absence of a precipitate was inspected. In addition, the change of an average particle diameter and the change of viscosity were measured by a coal tar counter and a rotational viscometer, respectively.

Examples 1 to 3, Comparative Example 1

Commercially available carbon black for color (#40; made by MITSUBISHI KASEI CORPORATION; particle diameter=20 nm) was spread on a nickel reaction dish, and it was then placed in a reaction vessel (made of nickel; diameter=300 mm and depth=400 mm) of a fluorinating treatment device. The atmosphere in the system was maintained in a vacuum state, and a fluorine gas was introduced thereinto and a fluorinating treatment was then carried out under conditions shown in Table 1 to obtain modified carbon black.

A water-soluble acrylic resin was dissolved in a mixed solvent of water and ethylene glycol, and the previously obtained modified carbon black and an antiseptic agent were added thereto. They were then mixed and dispersed by a sand mill to obtain a recording material. This recording material was used as an ink for an aqueous ball-point pen to carry out tests of dispersibility, writing performance and stability with time. The results are set forth in Table 1.

| | |
|---|---|
| Modified carbon black | 15.0% by weight |
| Water-soluble acrylic resin ["Hicoat FL-200", made by TOYO CHEMICAL CO., LTD.] | 5.0% by weight |
| Ethylene glycol | 30.0% by weight |
| Antiseptic agent ["Proxel XL-2", made by ICI Ltd.] | Slight amount |
| Water | Balance |
| | 100% by weight |

Comparative Example 2

The same procedure as in Example 1 was carried out except that all of modified carbon black was replaced with untreated carbon black. The results are set forth in Table 1.

Examples 4 to 6, Comparative Example 3

A commercially available graphite powder (LGV-1988; made by Lonza Co., Ltd.; particle diameter=2 $\mu$m) was subjected to a fluorinating treatment under conditions shown in Table 2 in accordance with the same procedure as in Examples 1 to 3 to obtain a modified graphite powder.

The obtained modified graphite powder was added to a mixed solvent of water and ethylene glycol, and they were mixed and dispersed by a sand mill. An acrylic resin emulsion, a viscosity modifier and an antiseptic agent were added thereto, thereby obtaining a recording material. This recording material was used as an ink for an aqueous felt pen to carry out tests of dispersibility, writing performance and stability with time. The results are set forth in Table 2.

| | |
|---|---|
| Modified graphite powder | 12.00% by weight |
| Acrylic resin emulsion ["Primal B-41", made by Rohm & Haas Co.] | 20.00% by weight |
| Viscosity modifier ["HEC SP400", made by DAICEL CHEMICAL INDUSTRIES, LTD.] | 0.02% by weight |
| Ethylene glycol | 5.00% by weight |
| Antiseptic agent ["Proxel XL-2", made by ICI Ltd.] | Slight amount |
| Water | Balance |
| | 100% by weight |

Comparative Example 4

The same procedure as in Example 4 was carried out except that all of a modified graphite powder was replaced with untreated carbon black. The results are set forth in Table 2.

TABLE 1

| | Example | | | Comp. Example | |
|---|---|---|---|---|---|
| | 1 | 2 | 3 | 1 | 2 |
| Conditions of Pigment Treatment | | | | | |
| Pigment | Carbon Black for Color | | | #40 | |
| Conditions of Fluorinating Treatment | | | | | |
| Temperature (°C.) | 20 | 20 | 0 | 80 | Untreated |
| Time (min) | 20 | 5 | 10 | 10 | Untreated |
| Partial Pressure | | | | | |
| Gas | Fluorine | Fluorine | Fluorine | Fluorine | Untreated |
| mmHg | 20 | 100 | 200 | 200 | |
| Gas | — | Nitrogen | Air | Nitrogen | Untreated |
| mmHg | — | 200 | 200 | 200 | |
| Results | | | | | |
| Dispersibility | | | | | |
| Average Particle Diameter (nm) | 108 | 97 | 103 | Not dispersed at all | 350 |
| Writing Performance | Good | Good | Good | — | Poor |
| Stability with Time (50° C., 1 month) | | | | | |
| Precipitate | Absent | Absent | Absent | — | Present |
| Average Particle Diameter (nm) | 110 | 102 | 104 | — | >1000 |
| Viscosity (cP) (initial/after 1 month) | 3.0/3.1 | 2.8/3.0 | 3.2/3.2 | — | 50/180 |

TABLE 2

| | Example | | | Comp. Example | |
|---|---|---|---|---|---|
| | 4 | 5 | 6 | 3 | 4 |
| Conditions of Pigment Treatment | | | | | |
| Pigment | Graphite Powder | | | LGV-1988 | |
| Conditions of Fluorinating Treatment | | | | | |
| Temperature (°C.) | 20 | 20 | 40 | 180 | Untreated |

TABLE 2-continued

|  | Example | | | Comp. Example | |
|---|---|---|---|---|---|
|  | 4 | 5 | 6 | 3 | 4 |
| Time (min) | 20 | 10 | 10 | 10 | Untreated |
| Partial Pressure | | | | | |
| Gas | Fluorine | Fluorine | Fluorine | Fluorine | Untreated |
| mmHg | 100 | 100 | 100 | 100 | |
| Gas | — | Nitrogen | Air | Nitrogen | Untreated |
| mmHg | — | 200 | 200 | 200 | |
| Results | | | | | |
| Dispersibility | | | | | |
| Average Particle Diameter ($\mu$m) | 2.0 | 1.9 | 2.2 | Not dispersed at all | 21 |
| Writing Performance | Good | Good | Good | — | Poor |
| Stability with Time (50° C., 1 month) | | | | | |
| Precipitate | Absent | Absent | Absent | — | Present |
| Average Particle Diameter ($\mu$m) | 2.1 | 2.0 | 2.2 | — | >100 |
| Viscosity (cP) (initial/after 1 month) | 21/23 | 19/20 | 23/23 | — | 50/83 |

What is claimed is:

1. An ink for a writing instrument, said ink comprising fluorine-surface modified carbon black, a water soluble acrylic resin, water, ethylene glycol, and an antiseptic agent.

2. A recording material comprising fluorine surface modified graphite powder, an acrylic resin-emulsion, water, ethylene glycol, a viscosity modifier and an antiseptic agent.

* * * * *